(12) United States Patent
Hachiro

(10) Patent No.: US 8,064,097 B2
(45) Date of Patent: Nov. 22, 2011

(54) IMAGE RECORDING APPARATUS AND METHOD OF CONTROL FOR PRINTING GROUP SELECTION SHEET WHEN NUMBER OF STORED IMAGES IN GROUP EXCEEDS THRESHOLD

(75) Inventor: Shigeki Hachiro, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 535 days.

(21) Appl. No.: 12/277,084

(22) Filed: Nov. 24, 2008

(65) Prior Publication Data
US 2009/0168089 A1 Jul. 2, 2009

(30) Foreign Application Priority Data
Dec. 26, 2007 (JP) ................. 2007-333831

(51) Int. Cl.
*H04N 1/21* (2006.01)
*H04N 1/40* (2006.01)
*G06K 15/02* (2006.01)

(52) U.S. Cl. ...... 358/1.6; 358/1.13; 358/1.16; 358/1.18; 358/524; 358/527; 358/404; 358/450; 348/231.1; 348/231.2; 348/231.3

(58) Field of Classification Search .................. 358/1.9, 358/1.6, 1.13, 1.16–1.18, 524, 527, 404, 358/444, 450, 471; 348/207.2, 231.99, 231.1, 348/231.2, 231.3
See application file for complete search history.

(56) References Cited

U.S. PATENT DOCUMENTS

| | | | |
|---|---|---|---|
| 6,628,899 B1 * | 9/2003 | Kito | 348/207.2 |
| 7,868,924 B2 * | 1/2011 | Matsushita et al. | 348/231.3 |
| 7,907,300 B2 * | 3/2011 | Suzuki | 358/1.16 |
| 2001/0040685 A1 | 11/2001 | Winter et al. | |
| 2005/0270579 A1 * | 12/2005 | Hibi et al. | 358/1.16 |
| 2006/0116993 A1 | 6/2006 | Oguri et al. | |
| 2007/0019018 A1 | 1/2007 | Wakai | |
| 2007/0086069 A1 * | 4/2007 | Matsuzaka et al. | 358/500 |
| 2007/0285680 A1 * | 12/2007 | Nakamura | 358/1.18 |
| 2009/0141315 A1 * | 6/2009 | Hachiro | 358/471 |
| 2010/0118342 A1 * | 5/2010 | Takio | 358/1.16 |

* cited by examiner

Primary Examiner — Scott A Rogers
(74) Attorney, Agent, or Firm — Canon USA Inc. IP Division

(57) ABSTRACT

A plurality of images stored in a storage medium are classified into image groups. The number of images stored in the storage medium is compared with a threshold value determined based on the number of classified image groups and the number of images included in each image group. An image group selection sheet or a print specification sheet is printed depending on a result of the comparison. Thus, it is possible to automatically determine an optimum type of sheet for use by a user to select images and print the determined type of sheet without printing a large number of sheets.

9 Claims, 15 Drawing Sheets

(STEP 1) PRINT SETTING: SELECT PAPER SIZE AND PAPER TYPE

| PAPER SIZE: | L ○  2L ○  A4 ○  LTR ○ |
|---|---|
| PAPER TYPE: | PHOTO ○  PLAIN ○ |

(STEP 2)
PICTURE SELECTION: CHECK PICTURES YOU WANT TO PRINT

| CategoryID | CategoryInfo | ImageStartID | ImageEndID | NumOfImage |
|---|---|---|---|---|
| 0001 | 10/20/2005 | 1 | 4 | 4 |
| 0002 | 10/25/2005 | 5 | 8 | 4 |
| 0003 | 11/01/2005 | 9 | 14 | 6 |
| 0004 | 11/02/2005 | 15 | 25 | 11 |
| 0005 | 11/03/2005 | 26 | 30 | 5 |
| 0006 | 11/21/2005 | 31 | 34 | 4 |
| 0007 | 11/22/2005 | 35 | 42 | 8 |
| 0008 | 12/24/2005 | 43 | 44 | 2 |
| 0009 | 12/25/2005 | 45 | 47 | 3 |
| 0010 | 12/31/2005 | 48 | 64 | 17 |
| 0011 | 01/01/2006 | 65 | 72 | 8 |

| CategoryID | CategoryInfo | ImageStartID | ImageEndID | NumOfImage |
|---|---|---|---|---|
| 0001 | 10/20/2005 | 1 | 4 | 4 |
| 0002 | 10/25/2005 | 5 | 8 | 4 |
| 0003 | 11/01/2005 | 9 | 14 | 6 |
| 0004 | 11/02/2005 | 15 | 25 | 11 |
| 0005 | 11/03/2005 | 26 | 30 | 5 |
| 0006 | 11/21/2005 | 31 | 34 | 4 |
| 0007 | 11/22/2005 | 35 | 41 | 7 |
| 0008 | 12/24/2005 | 42 | 43 | 2 |
| 0009 | 12/25/2005 | 44 | 46 | 3 |
| 0010 | 12/31/2005 | 47 | 61 | 15 |
| 0011 | 01/01/2006 | 62 | 71 | 10 |
| 0012 | 01/02/2006 | 72 | 108 | 37 |

| CategoryID | CategoryInfo | ImageStartID | ImageEndID | NumOfImage |
|---|---|---|---|---|
| 0001 | 10/2005 | 1 | 121 | 121 |
| 0002 | 11/2005 | 122 | 172 | 51 |
| 0003 | 12/2005 | 173 | 271 | 99 |
| 0004 | 01/2006 | 272 | 311 | 40 |
| 0005 | 02/2006 | 312 | 332 | 21 |
| 0006 | 03/2006 | 333 | 383 | 51 |
| 0007 | 04/2006 | 384 | 396 | 13 |
| 0008 | 05/2006 | 397 | 447 | 51 |
| 0009 | 06/2006 | 448 | 468 | 21 |
| 0010 | 07/2006 | 469 | 571 | 103 |
| 0011 | 08/2006 | 572 | 625 | 54 |
| 0012 | 09/2006 | 626 | 662 | 37 |

| CategoryID | CategoryInfo | ImageStartID | ImageEndID | NumOfImage |
|---|---|---|---|---|
| 0001 | 10/01/2005 | 1 | 4 | 4 |
| 0002 | 10/02/2005 | 5 | 10 | 6 |
| 0003 | 10/03/2005 | 11 | 21 | 11 |
| 0004 | 10/04/2005 | 22 | 42 | 21 |
| 0005 | 10/08/2005 | 43 | 45 | 3 |
| 0006 | 10/10/2005 | 46 | 82 | 37 |
| 0007 | 10/12/2005 | 83 | 84 | 2 |
| 0008 | 10/19/2005 | 85 | 87 | 3 |
| 0009 | 10/21/2005 | 88 | 91 | 4 |
| 0010 | 10/23/2005 | 92 | 100 | 9 |
| 0011 | 10/27/2006 | 101 | 111 | 11 |
| 0012 | 10/28/2006 | 112 | 121 | 10 |

MANY IMAGE FILES ARE STORED IN MEMORY CARD.
YOU CAN NARROW DOWN IMAGE FILES USING THIS SHEET.
CHECK DATES OF PICTURES YOU WANT TO PRINT, AND THEN
SCAN THE SHEET.

(STEP 1)
DATE SELECTION: CHECK DATES OF PICTURES YOU WANT TO PRINT

| REPRESENTATIVE THUMBNAIL IMAGE | REPRESENTATIVE THUMBNAIL IMAGE | REPRESENTATIVE THUMBNAIL IMAGE | REPRESENTATIVE THUMBNAIL IMAGE | REPRESENTATIVE THUMBNAIL IMAGE |
|---|---|---|---|---|
| SHOOT DATE 10/01/2005 ○ | SHOOT DATE 10/02/2005 ○ | SHOOT DATE 10/03/2005 ○ | SHOOT DATE 10/04/2005 ○ | SHOOT DATE 10/08/2005 ○ |
| REPRESENTATIVE THUMBNAIL IMAGE | REPRESENTATIVE THUMBNAIL IMAGE | REPRESENTATIVE THUMBNAIL IMAGE | REPRESENTATIVE THUMBNAIL IMAGE | REPRESENTATIVE THUMBNAIL IMAGE |
| SHOOT DATE 10/10/2005 ○ | SHOOT DATE 10/12/2005 ○ | SHOOT DATE 10/19/2005 ○ | SHOOT DATE 10/21/2005 ○ | SHOOT DATE 10/23/2005 ○ |
| REPRESENTATIVE THUMBNAIL IMAGE | REPRESENTATIVE THUMBNAIL IMAGE | | | |
| SHOOT DATE 10/27/2005 ○ | SHOOT DATE 10/28/2005 ○ | | | |

| CategoryID | CategoryInfo | ImageStartID | ImageEndID | NumOfImage |
|---|---|---|---|---|
| 0001 | 12/07/2005 | 1 | 7 | 7 |
| 0002 | 12/08/2005 | 8 | 11 | 4 |
| 0003 | 12/12/2005 | 12 | 22 | 11 |
| 0004 | 12/14/2005 | 23 | 29 | 7 |
| 0005 | 12/15/2005 | 30 | 39 | 10 |
| 0006 | 12/20/2005 | 40 | 44 | 5 |
| 0007 | 12/24/2005 | 45 | 84 | 40 |
| 0008 | 12/25/2005 | 85 | 96 | 12 |
| 0009 | 12/31/2005 | 97 | 99 | 3 | ated into one or more image groups, a comparison
IMAGE RECORDING APPARATUS AND METHOD OF CONTROL FOR PRINTING GROUP SELECTION SHEET WHEN NUMBER OF STORED IMAGES IN GROUP EXCEEDS THRESHOLD

BACKGROUND OF THE INVENTION

1. Field of the Invention

The present invention relates to an image recording apparatus configured to print images stored in the form of image files in a storage medium on a sheet for use by a user to select images to be printed, and read the sheet to analyze which images were selected by the user whereby it becomes possible to print image files selected by the user.

2. Description of the Related Art

In recent years, instead of using a printer called an SFP (Single Function Printer) having only a printing function, it has become popular to use a printer called an MFP (Multi Function Printer) having many functions such as an image reading function in addition to the printing function.

More specifically, the MFP operates under the control of an external device such as a PC (Personal Computer) to provide a plurality of functions in addition to the printing function. Examples of functions provided in addition to the printing function include a "direct print function" that allows image data stored in a memory card or the like to be printed, a "scan function" that allows a document to be scanned under the control of an external device such as a PC, a "copy function" that allows image data captured by the scan function to be printed, etc.

US Patent Application Publication No. 20010040685 discloses a technique to add a further function to the direct print function to allow a user to specify images by using a sheet and print the specified images. In this technique, a sheet used to select images is printed by a printer. A user fills in one or more marks on the sheet to specify images the user wants to print or store. The sheet is then scanned by a scanner, and the images selected by the user are detected based on the information obtained via the scanning. The detected images are then printed or stored. This technique allows the user to easily select images to be subjected to a process such as printing, without having to perform a complicated operation.

However, in a case where a user selects images from a large number of images, it is necessary to print a large number of sheets, and thus a large number of sheets and a large amount of ink are consumed. To avoid the above problem, for example, US Patent Application Publication No. 2006116993 discloses a technique to more efficiently select images. More specifically, in this technique, search items such as file names by which to search for images are printed on a sheet. A user selects search items by filling in corresponding marks on the sheet. This sheet is then scanned, and the search items selected by the user are detected based on the information obtained via the scanning. Images are then searched for based on the detected search items. This technique allows the user to narrow down images using the sheet, and thus the user can more efficiently select images. In this technique, it is necessary to print a less number of sheets for use to select images.

In a technique disclosed in US Patent Application Publication No. 2007019018, two types of sheets are printed. One is for selecting image groups to narrow down images. This type of sheet is referred to as an image group selection sheet. The other one is for specifying images to be printed. This type of sheet is referred to as a print specification sheet. In this technique, an image group selection sheet is first printed. A user selects image groups by filling in marks corresponding to image groups on the sheet. The image groups selected by the user are detected based on information obtained by scanning the image group selection sheet, and the detected image groups are printed on a print specification sheet. The user selects images the user wants to print from the images printed on the print specification sheet by filling in marks corresponding to the images thereby specifying the images to be printed. This sheet is then read to detect the images selected by the user, and the detected images are printed. This technique allows the user to specify images using a rather small number of sheets even in the case where there are a great number of images.

However, in a case where there are a rather small number of images, use of two types of sheets, i.e., the image group selection sheet and the print specification sheet does not always result in a reduction of the number of sheets printed. For example, when there are a small number of images all of which can be printed on a single print specification sheet, if an image group selection sheet is printed, a total of two sheets are printed although only one sheet is sufficient.

In the above-described operation flow, after a user selects image groups using an image group selection sheet, images to be printed are specified using a print specification sheet. In this operation flow, the sheet reading process is performed a greater number of times than in the case where only the print specification sheets is printed, and thus the user has to perform a more complicated procedure. Furthermore, when the user selects image groups by filling in corresponding marks on the image group selection sheet, there is a possibility that the selected image groups do not include images intended by the user. This means that, depending on the situation, it is more desirable to print not image group selection sheets but print only specification sheets even if this leads to an increase in the number of sheets printed.

That is, in some cases, it is more desirable for a user to directly get print specification sheets without getting image group selection sheets. However, before one of types of sheet is actually printed, it is difficult to determine which type of sheet is more desirable for the user. Thus, it is desirable to provide a technique to correctly determine which type of sheet should be printed, before the printing is actually performed.

Because the purpose of the use of sheets is to allow a user to easily select images to be printed, it is desirable that the above-described determination can be made easily without having the user to perform a complicated operation. That is, it is desirable to provide a technique to automatically select a proper sheet and print the selected sheet without requiring involvement by a user.

SUMMARY OF THE INVENTION

In view of the above, the present invention provides an image recording apparatus capable of automatically determining a proper sheet for use by a user to select images to be printed without printing a large number of sheets.

More specifically, an embodiment of the present invention provides an image recording apparatus including a reading unit configured to read a document, a classification unit configured to classify a plurality of images stored in the external storage medium into one or more image groups, a comparison unit configured to compare the number of images stored in the external storage medium with a threshold value determined based on the number of image groups classified by the classification unit and the numbers of images included in the respective image groups, an image group selection sheet print unit configured such that, if a result of the comparison made by the comparison unit indicates that the number of images stored in the external storage medium is greater than the threshold value, then the image group selection sheet print unit prints an image group selection sheet for use by a user to select one or more of the image groups classified by the classification unit, a first detection unit configured to detect an image group selected by a user, based on image data obtained by reading the image group selection sheet by the reading unit, a print specification sheet print unit configured to print a print specification sheet such that images included in the image group detected by the first detection unit are printed on the print specification sheet, a second detection unit configured to detect an image selected by the user from the images included in the image group, based on a result of analysis on the image data obtained by reading the print specification sheet by the reading unit, and a recording unit configured to read the image detected by the second detection unit from the external storage medium and record the image on recording paper.

The image recording apparatus configured in the above-described manner is capable of providing a proper sheet for use by a user to select images by performing a simple operation.

Further features of the present invention will become apparent from the following description of exemplary embodiments with reference to the attached drawings.

BRIEF DESCRIPTION OF THE DRAWINGS

FIG. 6 is a diagram illustrating an example of a print specification sheet used to select one or more images to be printed.

FIG. 8 is a diagram illustrating an example of a classification information list.

FIG. 9 is a diagram illustrating an example of a classification information list.

FIG. 12 is a diagram illustrating an example of a classification information list.

FIG. 15 is a diagram illustrating an example of a classification information list.

FIG. 16 is a diagram illustrating an example of an image group selection sheet.

FIG. 17 is a diagram illustrating an example of a classification information list.

DESCRIPTION OF THE EMBODIMENTS

Embodiments of the present invention are described below.

Figure 1:
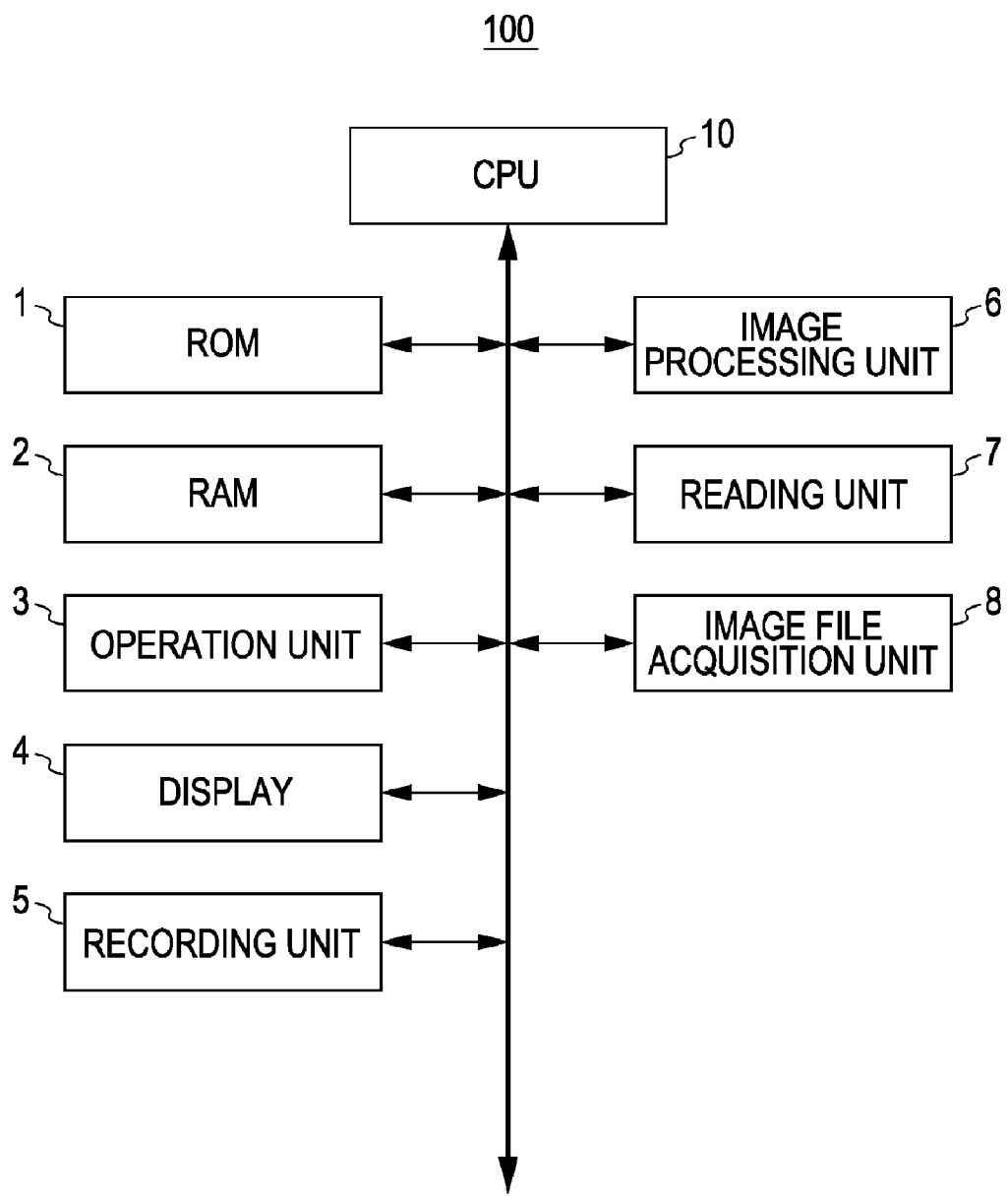
FIG. 1 is a block diagram illustrating a configuration of an image recording apparatus according to an embodiment of the present invention.

FIG. 1 is a block diagram illustrating a configuration of an image recording apparatus 100 according to an embodiment of the present invention.

The image recording apparatus 100 includes a CPU 10, a ROM 1, a RAM 2, an operation unit 3, a display 4, a recording unit 5, an image processing unit 6, a reading unit 7, and an image file acquisition unit 8.

The CPU 10 is a unit that controls the whole image recording apparatus 100. In the ROM 1, a control program is stored. The CPU 10 reads the control program from the ROM 1, and performs the control according to the control program. The RAM 2 is a storage medium for temporarily storing data. For example, image data read from a memory card is stored in the RAM 2.

The operation unit 3 includes keys and the like and is operated by a user. More specifically, the user is allowed to input a command by operating the operation unit 3.

The display 4 is implemented, for example, by a liquid crystal display and operates to display various kinds of guidance information for a user and images under the control of the CPU 10.

The recording unit 5 has an ink-jet recording capability. More specifically, the image processing unit 6 processes image data stored in the RAM 2, and the recording unit 5 records the resultant image data on recording paper. The recording method is not limited to the ink-jet method, but many other methods such as electrophotograpy may be used.

The image processing unit 6 perform image processing as required, such as image analysis, image data compression, image data decompression, image correction, color conversion, etc. The image data obtained as a result of the image processing is stored in the RAM 2.

The reading unit 7 includes a CCD configured to read a document image and output analog luminance data of red (R), green (G), and blue (B). Instead of the CCD, the reading unit 7 may use a CIS (Contact Image Sensor).

The image file acquisition unit 8 receives image data input from the outside. The image file acquisition unit 8 is implemented, for example, by a memory card reader. The memory card reader accesses a memory card and acquires image data and associated information stored in the memory card. An example of the image data stored in the memory card is a digital image file produced as a result of an image capturing operation performed by a digital still camera. Instead of the memory card reader, many other devices may be used to implement the image file acquisition unit 8. For example, a network adapter may be used to acquire an image file via a network. Another example is a nonvolatile magnetic storage device or the like disposed in the image recording apparatus 100.

Figure 2:
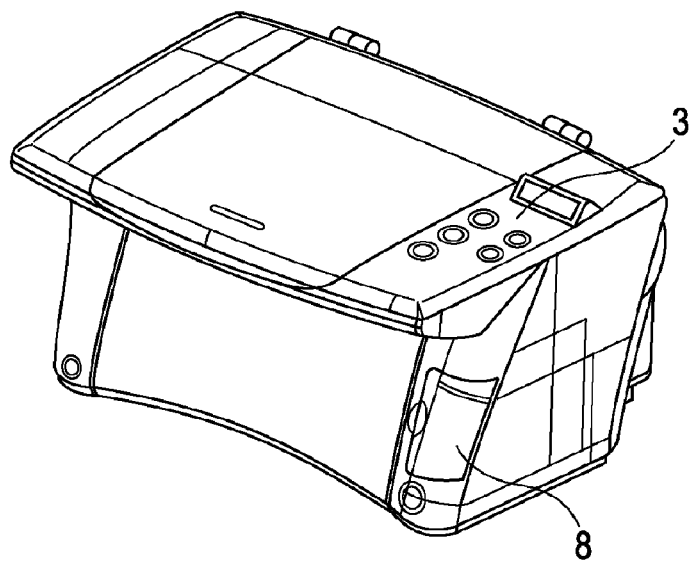
FIG. 2 is a perspective view of an image recording apparatus.
Figure 3:
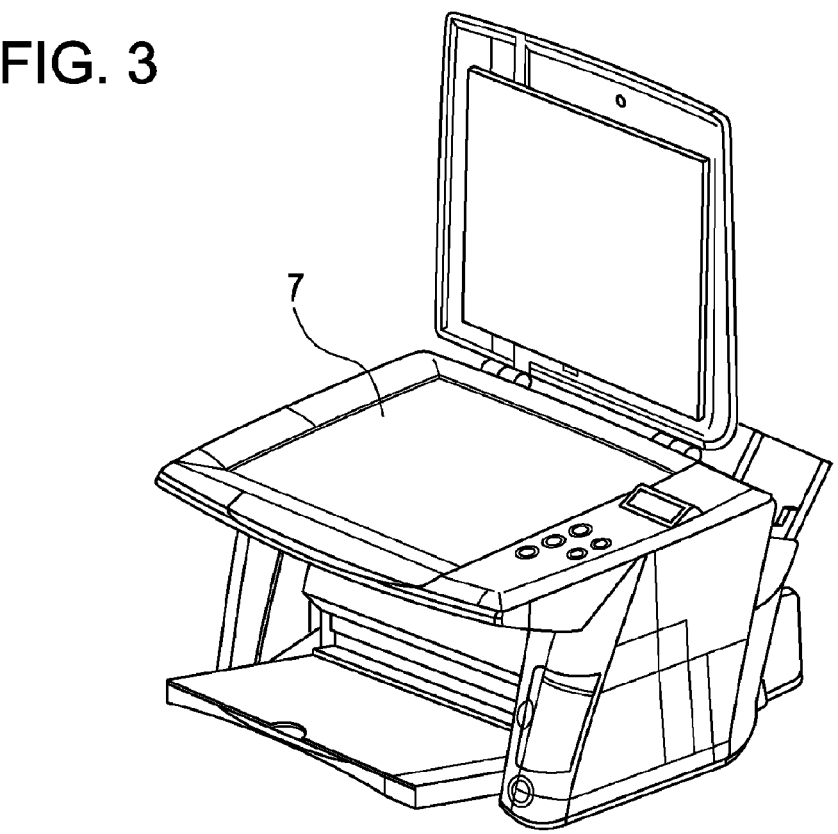
FIG. 3 is a perspective view of an image recording apparatus.

FIG. 2 and FIG. 3 are perspective views of the image recording apparatus 100.

When a user wants to read image data from a memory card into the image recording apparatus 100, the user inserts the memory card into the image file acquisition unit 8 and operates the operation unit 3. If a cover is opened, a document platen appears as shown in FIG. 3. If a user puts a document on the document platen and operates the operation unit 3, the document is read. A copy function is realized by printing image data obtained by reading a document in the above-described manner. A scan function is realized by transmitting image data to an external device such as a PC. The image data obtained in the above described manner may be stored in the memory card inserted in the image file acquisition unit.

In the present embodiment, it is assumed by way of example that the image file is that captured by the digital still camera, although any other image file such as an image file obtained by scanning a document, an image file produced on a PC, etc., may be used.

Figure 4:
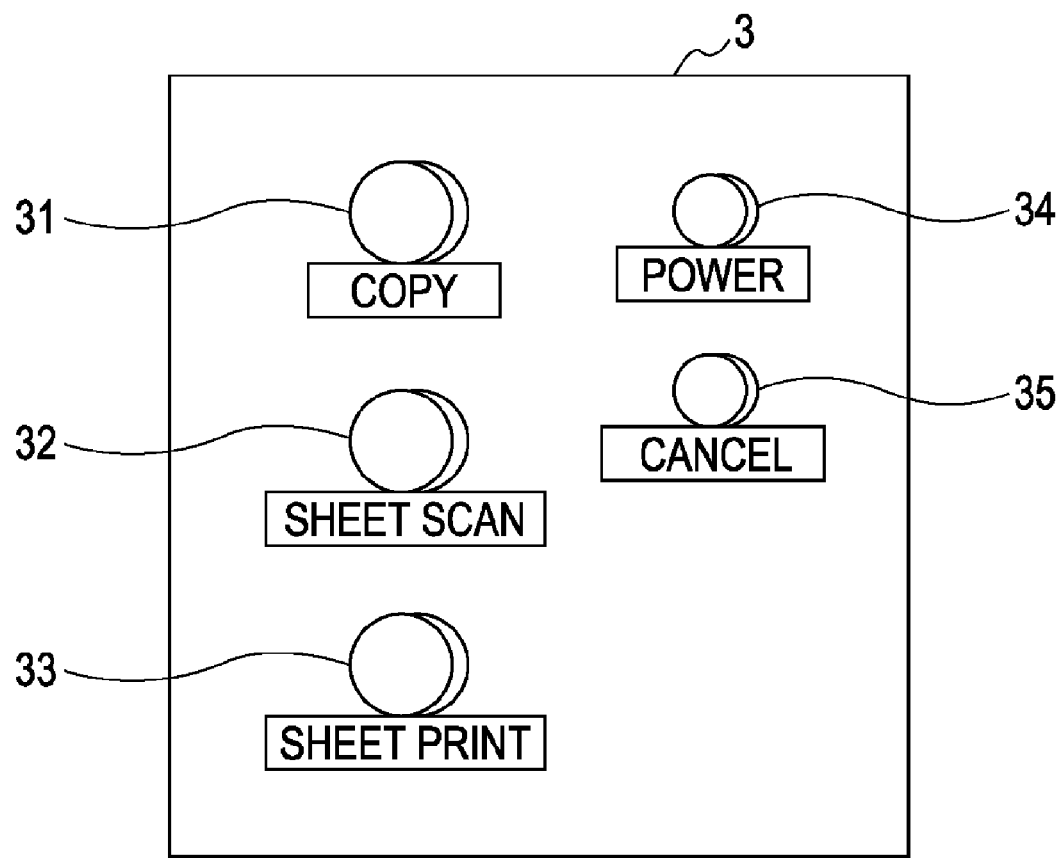
FIG. 4 is a diagram illustrating an operation unit.

FIG. 4 illustrates the operation unit 3.

As shown in FIG. 4, the operation unit 3 includes a copy key 31 for executing a copying operation, a sheet scan key 32 for executing a reading operation, and a print key 33 for executing an operation of printing a sheet. The operation unit 3 also includes a power key 34 and a cancel key 35.

The CPU 10 detects whether these keys are pressed or not, and controls various parts in accordance with a detection result. The configuration of the keys is not limited to that described above, but the keys may be configured in various manners. For example, the sheet scan key 32 and the sheet print key 33 may be implemented using a single key. A display may be provided on the operation unit 3 so that an interactive operation is allowed.

In the present embodiment, if a user presses the sheet print key 33, an image group selection sheet SH11 (FIG. 5) for use to select image groups or a print specification sheet SH2 (FIG. 6) for use to select images are printed.

Figure 5:
FIG. 5 is a diagram illustrating an example of an image group selection sheet.

FIG. 5 illustrates an example of the image group selection sheet SH11.

In the present embodiment, the image group selection sheet SH11 is a sheet used to select one or more image groups. In the example shown in FIG. 5, the sheet is configured to allow a user to select one or more image groups based on shoot date/time. For the above purpose, the image group selection sheet SH11 has a description area 51, an image group selection area 52, and a group information area 53. In a case where image files are of Exif-JPEG format, each file has a header in which the shoot date is described. Therefore, it is possible to group images based on the shoot date described in the header.

In the description area 51, a description is written as to how to use the image group selection sheet SH11. The description written in the description area 51 may include information indicating that many image files are stored in the memory card and a user can select image groups using the image group selection sheet SH11, as in the example shown in FIG. 5.

In the image group selection area 52, representative images of the respective image groups classified by dates are printed in the form of thumbnail images. The date of each image group and a mark are printed below the representative image. Each image group has one mark printed below so that a user is allowed to select the image group by filling in the mark. In the example shown in FIG. 5, 25 dates are printed on one image group selection sheet SH11. In this example, it is assumed that marks are filled in, but, instead, marks may be checked by a user.

In the classification information area 53, a bar code is printed. The bar code indicates that this sheet is an image group selection sheet SH11 and also indicates the start and end dates of the shoot dates.

Note that the form of the image group selection sheet SH11 is not limited to that described above, but the image group selection sheet SH11 may be formed in various different forms as long as a user is allowed to select one or more image groups, and it is possible to detect the image groups selected by the user. For example, only shoot dates may be printed without printing representative images. Instead of classifying images by dates, the images may be classified by other issues or parameters. For example, the images may be classified by folder information defined by a user, or may be classified by scenes detected by analyzing the images. Additional information such as the number of images belonging to each group may also be printed.

FIG. 6 illustrates an example of the print specification sheet SH2 used by a user to select one or more images to be printed. As shown in FIG. 6, the print specification sheet SH2 has a print setting area 61, an image selection area 62, and an image information area 63.

In the print setting area 61, paper information specifying a paper size to be used in printing, a paper type, etc., is described by filling proper one or more of marks printed on the sheet. In addition to the information specifying conditions associated with paper, the print information may also include information specifying an adjustment process, an effective process, print quality, etc.

In the image selection area 62, thumbnail images and marks corresponding to the respective thumbnail images are printed. A user is allowed to select one or more images by filling one or more corresponding marks. In the present example, as shown in FIG. 6, 36 images are printed on one print specification sheet SH2.

In the image information area 63, a bar code is printed. The bar code indicates that this sheet is a print specification sheet SH2 and also indicates start and end IDs of the images printed on the sheet.

Note that the form of the print specification sheet SH2 is not limited to that described above, but the print specification sheet SH2 may be formed in various different forms as long as a user is allowed to select one or more images, and it is possible to detect the images selected by the user. For example, the print specification sheet SH2 may be configured to include number-of-copies information whereby a user is allowed to specify the number of copies to be produced for each image file. Note that the print setting area 61 does not necessarily need to be provided. In the case where the print specification sheet SH2 has no print setting area 61, print setting information indicating default printing conditions may be stored in advance in a nonvolatile storage area in the image recording apparatus 100, and printing may be performed according to the default printing conditions stored therein.

Next, a process of printing the sheet shown in FIG. 5 or that shown in FIG. 6 is explained below.

Figure 7:
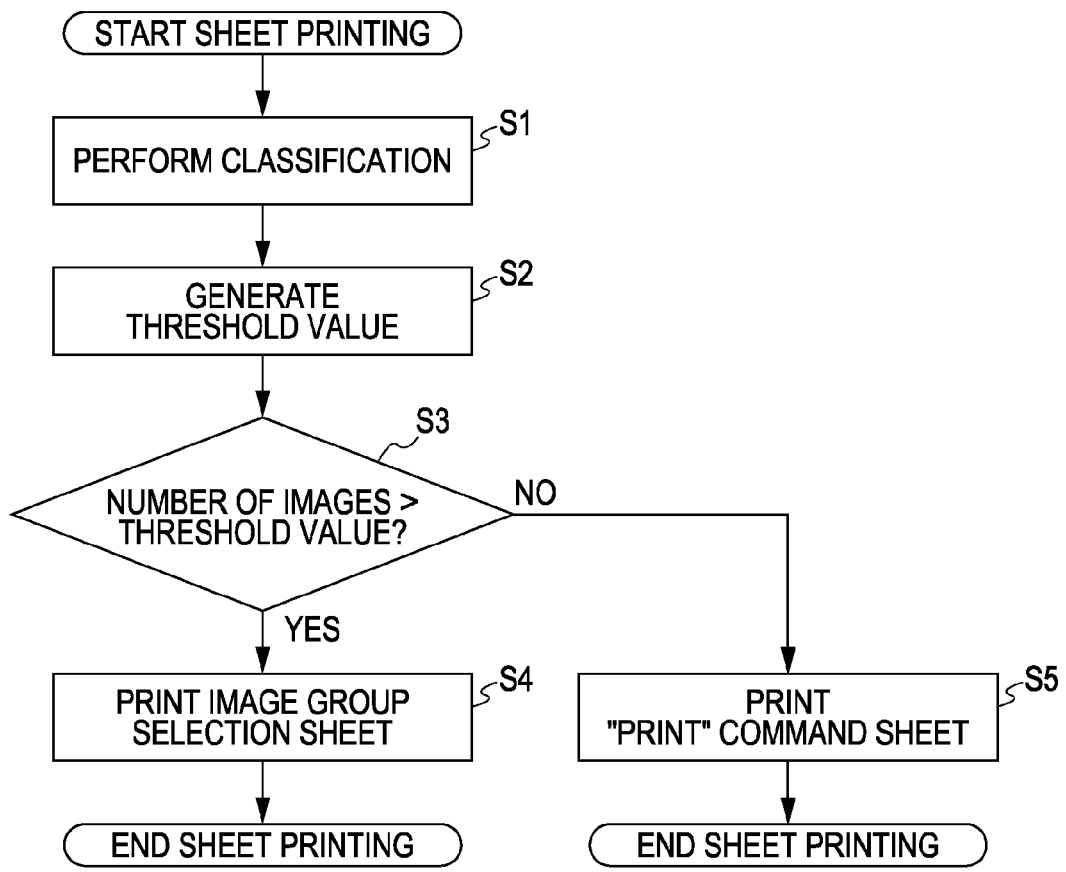
FIG. 7 is a flow chart illustrating a process performed when a sheet print key is pressed.

FIG. 7 is a flow chart illustrating a process performed when the sheet print key 33 is pressed. In the present embodiment, in a state in which a memory card is inserted in the image file acquisition unit 8, if the sheet print key 33 is pressed, then the CPU 10 of the image recording apparatus 100 executes the process shown in the form of the flow chart in FIG. 7 according to the program stored in the ROM 1.

If a user presses the sheet print key 33, then in step S1, a plurality of image files stored in the memory card are classified into image groups that will be printed on the image group selection sheet SH11.

The process in step S1 is explained in further detail below. FIG. 8 is a classification information list L1 associated with the image files classified in step S1. In the present example, images are classified according to shoot dates and resultant classified image groups are printed on the image group selection sheet SH11. For this purpose, in step S1, the classification information list L1 shown in FIG. 8 is produced based on the shoot date information attached to the image files stored in the memory card.

First, the image files stored in the memory card are sorted according to the shoot date, and image IDs (each of which is represented by a variable "ImageID") are uniquely assigned to the respective images. Note that the image IDs (each of which is represented by a variable "ImageID") are defined such that they correspond to file paths in the memory card, and the resultant image IDs are stored. Thereafter, category IDs (each of which is presented by a variable "CategoryID") are uniquely assigned to respective shoot dates in order from oldest to latest dates. Furthermore, shoot date information (represented by a variable "CategoryInfo") is added to each category ID (CategoryID). Furthermore, for each shoot date, an ID (ImageStartID) identifying a first one of images shot on the date and an ID (ImageEndID) identifying a last one of the images are added. Furthermore, the number of images (NumOfImage) shot on the same day is stored in association with the corresponding category ID (CategoryID).

In the example of the classification information list L1 shown in FIG. 8, a group identified by CategoryID=0004 is an image group shot on Nov. 2, 2005 (Nov. 2, 2005). This image group includes a total of 11 image files with image IDs from ImageID=15 to ImageID=25. Each image file can be acquired from the memory card, at a location indicated by an image file path corresponding to ImageID.

Via the process described above, the plurality of images stored in the memory card are classified. Note that the classification information does not necessarily need to be produced and stored in the above-described manner, but the classification information may be produced and stored in other manners.

Note that in the present embodiment, each "image group" does not necessarily need to include a plurality of images. That is, as a result of the classification, some image group may include only one image.

Next, in step S2, a threshold value TH is determined according to the number of groups produced in step S1, the numbers of images included in the respective groups, a maximum number of groups (MAX_LAY1), and a maximum number of images (MAX_LAY2).

The maximum number of groups (MAX_LAY1) indicates the maximum number of groups allowed to be selected by a user on one image group selection sheet SH11. The maximum number of images (MAX_LAY2) indicates the maximum number of images allowed to be selected by a user on one print specification sheet SH2. In the present embodiment, image groups or images selected by a user are detected based on locations of marks filled in by a user, and thus the maximum number of groups and the maximum number of images are equal to the maximum number of marks allowed to be printed on one sheet. In each of the sheets shown in FIG. 5 and FIG. 6, the marks correspond in an one-to-one manner to the images or the image groups, and thus the maximum number of groups (MAX_LAY1) indicates the maximum number of image groups that can be put on one image group selection sheet SH11, and the maximum number of images (MAX_LAY2) indicates the maximum number of images that can be put on one print specification sheet SH2.

The minimum number of images included in one image group is denoted by MinOfImage. The threshold value TH is calculated according to equation (1) shown below.

$$TH=((NumOfCategory/MAX\_LAY1)+(MinOfImage/MAX\_LAY2))\times MAX\_LAY2 \quad (1)$$

Note that when the division result has decimals, the decimals are raised to a next whole number.

If the classification information list produced in step S1 is given by the classification result (classification information list L1) shown in FIG. 8, then in step S2, the threshold value TH calculated with NumOfCategory=11 and MinOfImage=2. Note that MAX_LAY1=25 as shown in FIG. 5, and MAX_LAY2=36 as shown in FIG. 6. If the value of these parameters are substituted into equation (1), TH=(($11/25$)+($2/36$))×36, and thus the threshold value TH is calculated as 72.

Next, in step S3, the total number of classified images (SumOfImages) is compared with the threshold value TH determined in step S2. If inequality (2) shown below holds true, then in step S4, the image group selection sheet SH11 is printed. However, if equality (2) is false, then in step S5, the print specification sheet SH2 is printed.

$$SumOfImage > TH \quad (2)$$

In the case where the classification information list produced in step S1 is that shown in FIG. 8, then SumOfImage=72 and TH=72, and thus inequality (2) becomes false. Thus, in this case, the print specification sheet SH2 is printed in step S5. In this case, in step S5, a total of two print specification sheets SH2 are printed. That is, a first sheet including 36 images and a second sheet including 36 images are printed.

In the image information area 63 of each print specification sheet printed in step S5, a bar code is printed which includes information indicating that this sheet is a print specification sheet SH2 and also includes ImageID having a least value of all images printed on the sheet.

Next, another example of a classification information list is explained. FIG. 9 is a diagram illustrating an example of a classification information list.

In the case where the classification in step S1 results in that shown in FIG. 9, then the threshold value TH is calculated in step S2 as TH=(($12/25$)+($2/36$))×36, and thus the threshold value TH is given as 72. The threshold value TH is equal to that used in the case where the classification in step S1 results in that shown in FIG. 8. However, SumOfImage=108, and thus inequality in step S3 becomes true, and the image group selection sheet SH12 is printed in step S4.

Figure 10:
FIG. 10 is a diagram illustrating an example of an image group selection sheet.

FIG. 10 shows an example of the image group selection sheet SH12.

A representative image of each image group is determined, for example, as follows. An image having a smallest image ID (ImageID) is selected from an image group, and the selected image is employed as the representative image of this image group. In the classification information area 53, a bar code is printed to indicate that the this sheet is an image group selection sheet SH12 and also indicate a category ID (CategoryID) with a smallest value of all groups printed on the sheet.

Thus, after the user inserts a memory card in the image file acquisition unit 8, if the user presses the sheet print key 33, an image group selection sheet SH11 or a print specification sheet SH2 for use by the user to select one or more of the images stored in the memory card is automatically printed via the process described above.

If the user fills in one or more marks on the image group selection sheet SH11 or the print specification sheet SH2, then the following process is performed as described below.

Figure 11:
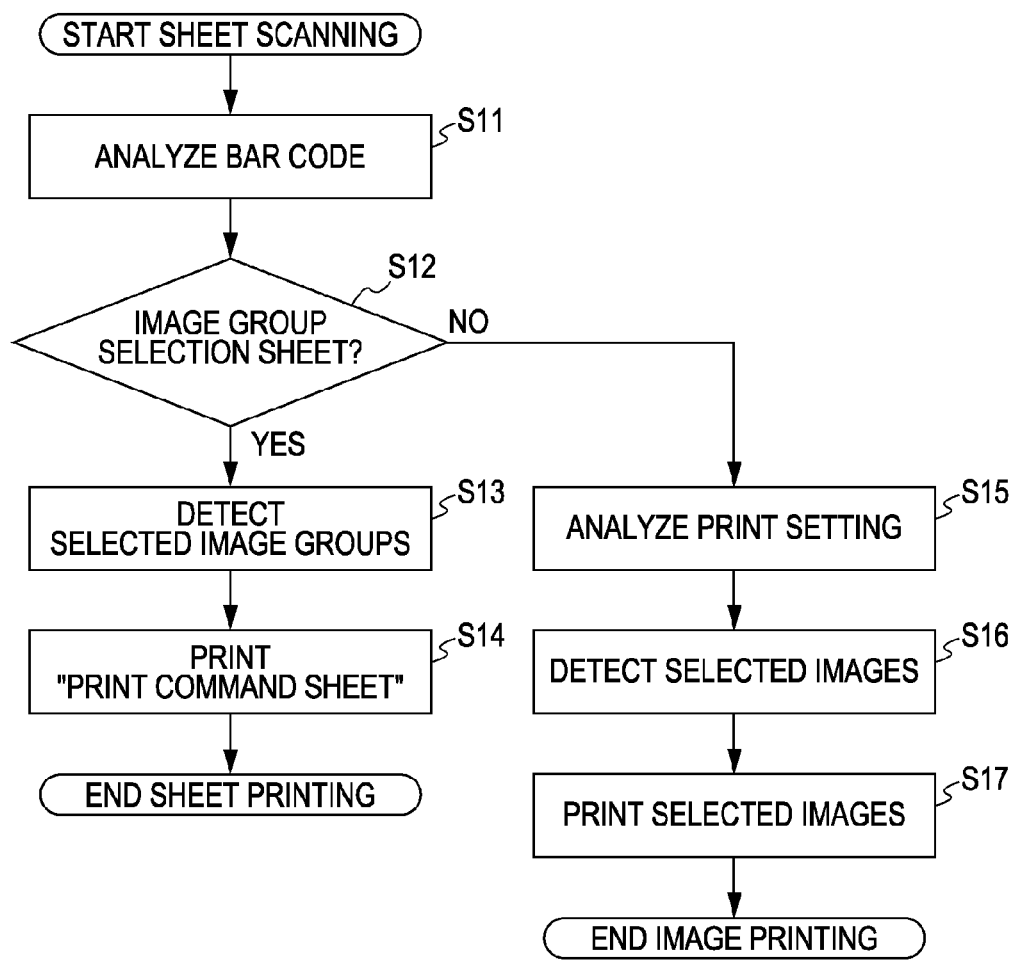
FIG. 11 is a flow chart illustrating a process performed after a sheet is read.

FIG. 11 is a flow chart illustrating a process performed after the sheet is read. If the user sets the image group selection sheet or the print specification sheet on the reading unit 7 and presses the sheet scan key 32, then the CPU 10 of the image recording apparatus 100 performs the process shown in the form of the flow chart in FIG. 11 according to the program stored in the ROM 1.

First, the sheet is scanned by the reading unit 7, and image data obtained as a result of the scanning is stored in the RAM 2. In step S11, bar code information of the read sheet is analyzed based on the image data stored in the RAM 2. As described above, the bar code includes information indicating whether the sheet is an image group selection sheet or a print specification sheet, and thus it is possible to determine the type of the sheet based on the information included in the bar code.

In step S12, a determination is made based on the bar code information as to whether the read sheet is an image group selection sheet or a print specification sheet. If the read sheet is an image group selection sheet, then the processing flow proceeds to step S13.

In step S13, a determination is made as to which image groups have been selected by a user. To perform the determination, first, locations of marks filled in by the user are determined based on sheet image data stored in the RAM 2. Next, a category ID (CategoryID) with a smallest value among groups put on the image group selection sheet is extracted from the bar code. Thus, from the locations of the marks filled in by the user and CategoryID extracted from the bar code, it is possible to detect CategoryID corresponding to the marks filled in by the user. That is, image groups selected by the user are detected.

A specific example of the process in step S13 is explained below. In the following explanation, it is assumed that an image group selection sheet SH12 given by a user is scanned, and an image group shot on Dec. 31, 2005 is selected in the image group selection area 52. It is also assumed that in the sheet print process, the classification information shown in FIG. 9 is obtained as a result of the process in step S1.

First, CategoryID=0001 is detected as a least-value category ID from the bar code information. Next, from the location of the mark filled in by the user, it is detected that a 10-th image group on the sheet was detected by the user. Thus, it is detected that the image group detected by the user has CategoryID=0010 that is a 10-th category ID as counted from CategoryID=0001.

Next, in step S14, print data of the print specification sheet is produced according to the images belonging to the detected category ID (CategoryID), and the print specification sheet is printed. More specifically, first, ImageStartID=47 and ImageEndID=61 corresponding to CategoryID=0010 are detected from the classification information list L2 produced in step S1 in the sheet print process. Next, the print data of the print specification sheet is produced using 15 images with ImageID of 47 to 61, and the print specification sheet is printed. In a case where a plurality of marks were filled in by the user, one print specification sheet SH2 is printed for each of the image groups corresponding to the marks.

On the other hand, in the case where the determination in step S12 indicates that the sheet is a print specification sheet, the processing flow proceeds to step S15. In step S15, the locations of marks filled in by the user in the print setting area 61 are determined from the image data of the sheet stored in the RAM 2. Thus, the paper size and the paper type selected by the user are detected.

Next, in step S16, images selected by the user are detected. Image IDs (ImageID) of the images selected by the user are determined based on the position information associated with the marks filled in by the user and the smallest image ID (ImageID) of the sheet indicated by the bar code.

Finally, in step S17, image files corresponding to the image IDs (ImageID) determined in step S16 are printed.

In the process described above, in the case where a plurality of image groups are selected using the image group selection sheet, one print specification sheet is printed for each of the selected image groups. Alternatively, one print specification sheet may include images of a plurality of image groups thereby to reduce the total number of sheets printed. In this case, the bar code printed in the image information area 63 of the print specification sheet may include additional information identifying images selected by a user even for images of a plurality of image groups. More specifically, for example, the bar code may include information indicating an image ID (ImageID) with the smallest value of all images printed on the sheet, an image ID (ImageID) with the greatest value, and category IDs (CategoryID) of all images printed on the sheet thereby to make it possible to correctly identify the respective image groups existing on the same sheet.

In the example described above, the threshold value TH is calculated using the minimum number of images (MinOfImage) included in one image group among all image groups according to equation (1). Alternatively, the threshold value TH may be calculated using the maximum number of images (MaxOfImage) included in one image group among all image groups, as described in detail below. In this case, the process is the same as that described above except for the calculation of the threshold value TH.

The threshold value TH is calculated using MAX_LAY1, MAX_LAY2, NumOfCategory, and MaxOfImage according to equation (3) shown below.

$$TH = ((NumOfCategory/MAX\_LAY1) + (MaxOfImage/MAX\_LAY2)) \times MAX\_LAY2 \quad (3)$$

Note that when the division result has decimals, the decimals are raised to a next whole number.

If the classification in step S1 results in the classification information list L2 shown in FIG. 9, the number of images per group has a maximum value for an image group with CategoryID=0012. The number of images (NumOfImage) of the image group with CategoryID=0012 is equal to 37, and thus MaxOfImage=37. Substituting the parameter values into equation (3) yields $TH = ((^{12}/_{25}) + (^{37}/_{36})) \times 36 = 108$. Furthermore, SumOfImage=108.

Because SumOfImage=108 and TH=108, inequality in step S3 becomes false, and thus in step S5, a print specification sheet is printed. If the threshold value TH is calculated using equation (1) instead of equation (3), the result of the threshold value TH is 72. Thus, in this case, inequality (2) becomes true in step S3, and an image group selection sheet is printed.

As described above, even when the classification is performed in the same manner, the difference in the method of the calculation of the threshold value TH can lead to a different result.

The threshold value TH may be determined in other different manners. For example, the threshold value TH may be determined using statistical data such as the mean value or the median of the numbers of images included in groups. A margin may be added to the threshold value TH calculated according to equation (1) or (3). For example, the threshold value TH calculated according to equation (1) or (3) may be multiplied by 2, and the result may be used.

Instead of calculating the threshold value using the numbers of images included in image groups, the threshold value may be set to a predetermined default value. In this case, the threshold value may be defined in advance in the program or may be specified by a user. For example, the maximum allowable number of print specification sheets printed may be set to 5, and the value of 5×MAX_LAY2 may be used as the threshold value.

In the embodiments described above, after an image group selection sheet is scanned, a print specification sheet is printed in any situation. Alternatively, in a case where scanning of an image group selection sheet SH11 does not result in a sufficient reduction in the number of images, a further image group selection sheet may be printed. In any case, when the sheet print key 33 is pressed by a user, the process may be performed in a similar manner as described above with reference to FIG. 7.

FIG. 12 is a diagram illustrating another example of a classification information list. In this example, in step S1, images are classified according to months in which images were taken. More specifically, in this example, it is assumed that the total number of images (SumOfImage) stored in a memory card is equal to 662, and the classification information list L3 shown in FIG. 12 is obtained as a result of classifying the total of 662 images. In step S1, the resultant classification information list L3 is stored.

Next, in step S2, the threshold value TH is calculated according to equation (3) described above. Substituting the values of the parameters into equation (3) yields TH=(($12/25$)+($121/36$))×36=180.

The values of SumOfImage and TH cause inequality (2) to become true, and thus in step S4, an image group selection sheet is printed. In this case, the image group selection sheet printed has a form shown in FIG. 13.

Figure 13:
FIG. 13 is a diagram illustrating an example of an image group selection sheet.

A user fills in one or more marks corresponding to desired months on the image group selection sheet SH13 shown in FIG. 13. The user then sets the image group selection sheet SH13 on the reading unit 7 and presses the sheet scan key 32.

Figure 14:
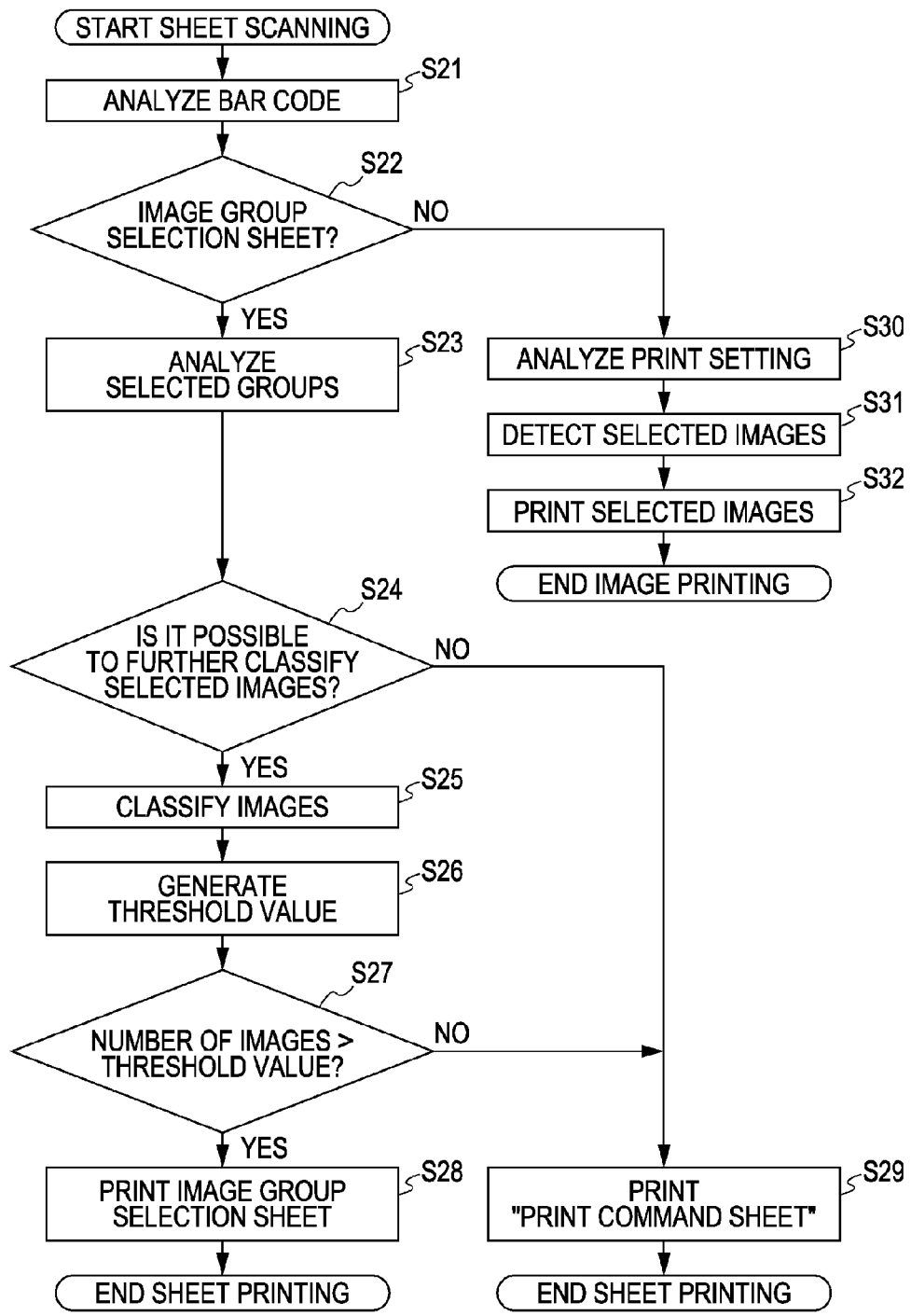
FIG. 14 is a flow chart illustrating a process performed when a sheet scan key is pressed and an image group selection sheet or the print specification sheet is scanned.

FIG. 14 is a flow chart illustrating a process performed when the sheet scan key 32 is pressed and the image group selection sheet SH13 or the print specification sheet is scanned. In this flow chart, in a case where scanning of an image group selection sheet does not result in a sufficient reduction in the number of images, a further image group selection sheet may be printed.

First, in step S21, the bar code in the classification information area is analyzed. If it is determined in step S22 that the sheet is an image group selection sheet SH13, then the processing flow proceeds to step S23. In step S23, the read scan data is analyzed to extract the bar code information in the classification information area and detect the locations of marks filled in by the user to detect the image groups selected by the user. For example, if a mark corresponding to October, 2005 is filled in by the user, then it is detected from the classification information list L3 shown in FIG. 12 that the month specified by the user has CategoryID=0001.

On the other hand, in the case where the determination in step S22 indicates that the sheet is a print specification sheet, the processing flow proceeds to step S30. In step S30, the locations of marks filled in by the user in the print setting area 61 are determined from the image data of the sheet stored in the RAM 2. Thus, the paper size and the paper type selected by the user are detected.

Next, in step S31, images selected by the user are detected. Image IDs (ImageID) of the images selected by the user are determined based on the position information associated with the marks filled in by the user and the smallest image ID (ImageID) of the sheet indicated by the bar code.

Finally, in step S32, image files corresponding to the image IDs (ImageID) determined in step S31 are printed.

In step S24, a determination is made as to whether the images with CategoryID=0001 can be further classified. If it is determined that further classification is impossible, then in step S29, the print specification sheet is printed. Because the classification information list L3 is based on the classification by months, it is possible to perform further classification by date. Thus, the processing flow proceeds to step S25 to further classify the images having CategoryID=0001 in the classification information list L3. More specifically, the further classification is performed according to the shoot dates, and a classification result in step S24 is stored as a classification information list L4a.

FIG. 15 illustrates an example of the classification information list L4a.

In step S26, the threshold value TH is determined. More specifically, the determination of the threshold value TH in step S26 is made according to equation (3) described above. Substituting the values of the parameters into equation (3) yields TH=(($12/25$)+($37/36$))×36=108. The total number of images (SumOfImage) is given by the number of images (NumOfImage) having CategoryID=0001 in the classification information list L3, and thus SumOfImage=121. In step S27, it is determined from the values of SumOfImage and TH that inequality (2) is true, and thus in step S28, image group selection sheet SH14 is printed.

FIG. 16 illustrates an example of an image group selection sheet SH14 obtained as a result of classification according to the shoot dates.

In a case where a mark corresponding to December, 2005 on the sheet shown in FIG. 13 is filled in by the user, it is determined in step S24 that the month specified by the user has CategoryID=0003.

Next, in step S25, the images having CategoryID=0003 in the classification information list L3 are further classified, and a classification information list L4b is produced as a result of the classification.

FIG. 17 illustrates an example of the classification information list L4b.

In step S26, the threshold value TH is determined by substituting the parameter values into equation (3) as TH= (($12/25$)+($40/36$))×36=108. The total number of image (SumOfImage) is given by the number of images of the image group with CategoryID=0003 in the classification information list L3, and thus SumOfImage=99. In step S27, it is determined from the values of SumOfImage and TH that inequality (2) is false, and thus in step S29, a print specification sheet is printed.

As described above, also in the case where image group selection sheets are printed one after another to allow a user to hierarchically narrow down the images, when an image group selection sheet does not provide an effectively narrowed-down result, a print specification sheet is automatically printed instead of the image group selection sheet, and thus a reduction in processing steps is achieved.

In the example described above, two image group selection sheets are used for a two-level hierarchical classification. That is, the image group selection sheet SH13 classified by months and the image group selection sheet SH14 classified by dates are used. The image group selection sheets may be provided for a hierarchical classification with a greater number of levels. For example, image group selection sheets may be provided for classifications by year, month, week, and date. In this case in which images are classified in four levels, i.e., year, month, week, and date, a user narrows down images starting with an image group selection sheet SH11 of year, and then uses image group selection sheets of month, week, and date one after another. Thus, a total of four sheets are printed.

In the process of narrowing down images in the hierarchical manner as described above, when the number of images included in one image group becomes small enough, a print specification sheet is automatically printed to allow a user to select images. The user performs a similar operation repeatedly until the user finally obtains a desired print specification sheet thereby to select images.

A combination of the above-described technique and other techniques can be useful to further reduce the total number of times image group selection sheets are printed. For example, if the number of image groups classified by year is smaller than a predetermined value, an image group selection sheet for selection by year is not produced but an image group selection sheet for selection by month is produced.

In the hierarchical narrowing down, the image group selection sheet may be the same in form regardless of whether the classification is based on the month or date or may be different in form depending on the item by which images are classified.

The two types of image group selection sheets SH13 and SH14 are both for narrowing down based on "time" although there is a difference in unit, i.e., one is based on month and the other is based on date. Alternatively, the item on which the narrowing down is based may be different from one sheet to another. For example, one sheet may be for narrowing down based on folder information, and another may be based on scenes of images obtained as a result of analysis on image data. More specifically, for example, an image group selection sheet SH13 may be produced based on a result of a classification according to folder information, and an image group selection sheet SH14 may be produced based on a result of a classification according to image scene information.

In the embodiments described above, it is assumed that printing is performed for image data stored in an external storage medium such as a memory card. However, in the present invention, the storage medium is not limited to the external storage medium such as the memory card or the like. Printing may be performed for image data stored in an internal storage medium such as a hard disk provided in the inside of an image recording apparatus.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-333831 filed Dec. 26, 2007, which is hereby incorporated by reference herein in its entirety.

What is claimed is:

1. An image recording apparatus including an insertion unit configured to accept an external storage medium, the image recording apparatus being configured to record an image stored in an external storage medium on recording paper, the image recording apparatus comprising:
   a reading unit configured to read a document;
   a classification unit configured to classify a plurality of images stored in the external storage medium into one or more image groups;
   a comparison unit configured to compare the number of images stored in the external storage medium with a threshold value determined based on the number of image groups classified by the classification unit and the numbers of images included in the respective image groups;
   an image group selection sheet print unit configured such that, if a result of the comparison made by the comparison unit indicates that the number of images stored in the external storage medium is greater than the threshold value, then the image group selection sheet print unit prints an image group selection sheet for use by a user to select one or more of the image groups classified by the classification unit;
   a first detection unit configured to detect an image group selected by a user, based on image data obtained by reading the image group selection sheet by the reading unit;
   a print specification sheet print unit configured to print a print specification sheet such that images included in the image group detected by the first detection unit are printed on the print specification sheet;
   a second detection unit configured to detect an image selected by the user from the images included in the image group, based on a result of analysis on the image data obtained by reading the print specification sheet by the reading unit; and
   a recording unit configured to read the image detected by the second detection unit from the external storage medium and record the image on recording paper.

2. The image recording apparatus according to claim 1, wherein the sheet printed by the print specification sheet print unit includes marks corresponding to respective images included in the image group, the marks being for use by a user to select one or more images by filling in the one or more corresponding marks.

3. The image recording apparatus according to claim 2, wherein the sheet printed by the image group selection sheet print unit includes marks corresponding to respective image groups classified by the classification unit, the marks being for use by a user to select one or more image groups by filling in the one or more corresponding marks.

4. The image recording apparatus according to claim 3, wherein the threshold value is determined based on a maximum number of marks allowed to be printed on the sheet printed by the print specification sheet print unit and a maximum number of marks allowed to be printed on the sheet printed by the image group selection sheet print unit.

5. An image recording apparatus including a reading unit configured to read a document, the image recording apparatus being configured to record an image stored in a storage medium on recording paper, the image recording apparatus comprising:
   a classification unit configured to classify a plurality of images stored in the storage medium into one or more image groups;
   a comparison unit configured to compare the number of images stored in the storage medium with a threshold value determined based on the number of image groups classified by the classification unit and the numbers of images included in the respective image groups; and
   an image group selection sheet print unit configured to print an image group selection sheet for use by a user to select one or more of the image groups classified by the classification unit, wherein
   when a result of the comparison made by the comparison unit indicates that the number of images stored in the storage medium is greater than the threshold value, the image group selection sheet print unit prints the image group selection sheet.

6. The image recording apparatus according to claim 5, further comprising a print specification sheet print unit configured to print a print specification sheet on which images stored in the storage medium are arranged, wherein
   when a result of the comparison made by the comparison unit indicates that the number of images stored in the storage medium is smaller than the threshold value, the print specification sheet print unit print the print specification sheet.

7. The image recording apparatus according to claim 6, further comprising:
- a detection unit configured to detect an image group selected by a user, based on image data obtained by reading the sheet printed by the image group selection sheet print unit by the reading unit; and
- a second comparison unit configured to compare the number of images included in the image group detected by the detection unit with a second threshold value determined based on the number of image groups classified by the classification unit and the numbers of images included in the respective image groups, wherein
- if a result of the comparison made by the second comparison unit indicates that the number of images included in the image group detected by the second detection unit is greater than the second threshold value, then the classification unit classifies the images included in the image group detected by the detection unit, and the image group selection sheet print unit prints the image group selection sheet.

8. The image recording apparatus according to claim 7, wherein, if a result of the comparison made by the second comparison unit indicates that the number of images included in the image group detected by the second detection unit is smaller than the second threshold value, the print specification sheet print unit prints a print specification sheet such that images included in the image group detected by the detection unit are printed on the print specification sheet.

9. A method of controlling an image recording apparatus including a reading unit configured to read a document and a recording unit configured to record on recording paper, the method comprising:
- classifying a plurality of images stored in a storage medium into one or more image groups;
- comparing the number of images stored in the storage medium with a threshold value determined based on the number of image groups classified in the classification step and the numbers of images included in the respective image groups; and
- performing a printing process such that, if a result of the comparison made in the comparison step indicates that the number of images stored in the storage medium is greater than the threshold value, then an image group selection sheet for use by a user to select one or more of the image groups classified in the classification step is printed.

* * * * *